(12) United States Patent
Tang et al.

(10) Patent No.: US 10,772,076 B2
(45) Date of Patent: Sep. 8, 2020

(54) COMMUNICATION METHOD, TERMINAL DEVICE, AND NETWORK DEVICE

(71) Applicant: Guangdong OPPO Mobile Telecommunications Corp., Ltd., Dongguan, Guangdong (CN)

(72) Inventors: Hai Tang, Guangdong (CN); Hua Xu, Ottawa (CA)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 16/312,072

(22) PCT Filed: Sep. 29, 2016

(86) PCT No.: PCT/CN2016/100829
§ 371 (c)(1),
(2) Date: Dec. 20, 2018

(87) PCT Pub. No.: WO2018/058438
PCT Pub. Date: Apr. 5, 2018

(65) Prior Publication Data
US 2019/0246376 A1     Aug. 8, 2019

(51) Int. Cl.
| H04L 12/28 | (2006.01) |
| H04W 72/02 | (2009.01) |
| H04W 72/12 | (2009.01) |
| H04W 52/14 | (2009.01) |
| H04W 52/24 | (2009.01) |
| H04W 72/04 | (2009.01) |

(52) U.S. Cl.
CPC ......... *H04W 72/02* (2013.01); *H04W 52/146* (2013.01); *H04W 52/242* (2013.01); *H04W 72/042* (2013.01); *H04W 72/0493* (2013.01); *H04W 72/12* (2013.01)

(58) Field of Classification Search
CPC ....................................................... H04L 12/28
USPC ....................................................... 370/329
See application file for complete search history.

(56) References Cited

U.S. PATENT DOCUMENTS

| 2015/0282213 A1 | 10/2015 | Sun et al. |
| 2017/0188316 A1 | 6/2017 | Seo et al. |
| 2017/0374558 A1* | 12/2017 | Zhao .................... H04W 16/10 |

FOREIGN PATENT DOCUMENTS

| CN | 103164283 A | 6/2013 |
| CN | 105323841 A | 2/2016 |

(Continued)

OTHER PUBLICATIONS

Extended European search report issued in corresponding European application No. 16917192.3 dated May 13, 2019.
(Continued)

*Primary Examiner* — Dang T Ton

(57) ABSTRACT

A communication method, a terminal device and a network device are provided. The method includes: determining, by a terminal device, a target resource pool from at least two resource pools according to a condition parameter of each resource pool in the at least two resource pools, wherein the condition parameter is used for indicating a resource usage condition of the resource pool; and communicating, by the terminal device, with a network device by using a resource of the target resource pool.

18 Claims, 5 Drawing Sheets

(56) References Cited

FOREIGN PATENT DOCUMENTS

| | | |
|---|---|---|
| CN | 105357757 A | 2/2016 |
| WO | 2014056426 A1 | 4/2014 |
| WO | 2015163638 A1 | 10/2015 |

OTHER PUBLICATIONS

English translation of CN OA for CN application No. 201680089465.6 dated May 29, 2020.

* cited by examiner

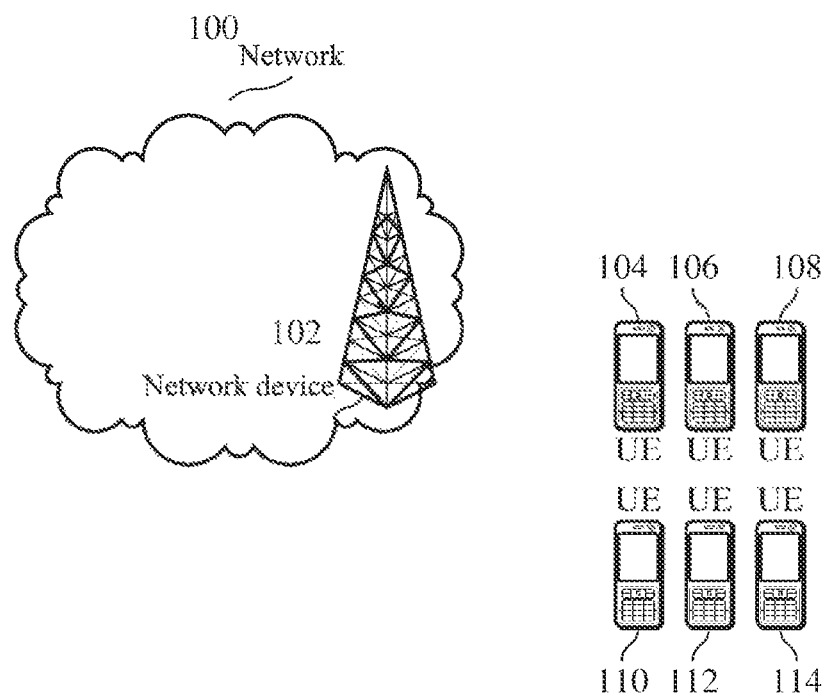

400

A terminal device determines a target resource pool according to a downlink path loss between the terminal device and a network device — 410

The terminal device communicates with a network device using a resource of the target resource pool — 420

COMMUNICATION METHOD, TERMINAL DEVICE, AND NETWORK DEVICE

CROSS-REFERENCE TO RELATED APPLICATION(S)

This application is a 371 application of International Application No. PCT/CN2016/100829, filed on Sep. 29, 2016, the entire disclosure of which is hereby incorporated by reference.

TECHNICAL FIELD

The present disclosure relates to the field of communication, and more particularly to a communication method, a terminal device and a network device.

BACKGROUND

In Long Term Evolution (LTE) systems, when uplink data needs to be transmitted, an uplink scheduling request (SR) mechanism is adopted by a user equipment (UE). By sending the uplink scheduling request to a base station, the UE informs the base station that the UE needs uplink resources for data transmission. After receiving the scheduling request from the UE, the base station allocates resources to the UE, and the UE performs data transmission on these allocated resources. However, the mechanism results in a large amount of signaling overhead.

In order to solve the problem, data transmission may be performed based on contention. That is, the UE does not need to request the base station to allocate resources for data transmission by the scheduling request, but randomly selects resources from a resource pool for data transmission.

For data transmission performed based on contention, the selection of resource has an important impact on the whole communication performance. Therefore, how to select appropriate resources is an urgent problem to be solved in technologies of data transmission based on contention.

SUMMARY

Implementations of the disclosure provide a communication method, a terminal device and a network device.

In a first aspect, a communication method is provided, which includes: determining, by a terminal device, a target resource pool from at least two resource pools according to a condition parameter of each resource pool in the at least two resource pools, wherein the condition parameter is used for indicating a resource usage condition of the resource pool; and communicating, by the terminal device, with a network device by using a resource of the target resource pool.

In connection with the first aspect, in a first possible implementation of the first aspect, the condition parameter includes at least one of the following: a resource utilization rate of the resource pool, a resource conflict rate of the resource pool, the quantity of accessed terminals in the resource pool, information of a receiving power of a resource of the resource pool, a time delay of data transmitted using the resource of the resource pool, response time of the network device to data transmitted using the resource of the resource pool, and an error rate of blocks transmitted using the resource of the resource pool.

In connection with the first aspect or any of the possible implementations described above, in a second possible implementation of the first aspect, the information of the receiving power of the resource of the resource pool includes at least one of the following: an average receiving power of resources of the resource pool, and dispersion degree information of receiving powers of the resources of the resource pool.

In combination with the first aspect or any of the possible implementations described above, in a third possible implementation in the first aspect, the determining the target resource pool from the at least two resource pools comprises: determining the target resource pool from resource pools, which are in the at least two resource pools, and whose corresponding resource utilization rates are less than or equal to a first threshold; or determining the target resource pool from resource pools, which are in the at least two resource pools, and whose corresponding resource conflict rates are less than or equal to a second threshold; or determining the target resource pool from resource pools, which are in the at least two resource pools, and in which the quantities of accessed terminals are less than or equal to a third threshold; or determining the target resource pool from resource pools, which are in the at least two resource pools, and whose corresponding response time is less than or equal to a fourth threshold; or determining the target resource pool from resource pools, which are in the at least two resource pools, and whose corresponding time delays are less than or equal to a fifth threshold value; or determining the target resource pool from resource pools, which are in the at least two resource pools, and whose corresponding dispersion degrees of receiving powers are less than or equal to a sixth threshold value; or determining the target resource pool from resource pools, which are in the at least two resource pools, and whose corresponding error rates of transmitted blocks are less than or equal to a seventh threshold; or determining the target resource pool from resource pools, which are in the at least two resource pools, and whose corresponding average receiving powers are less than or equal to an eighth threshold.

In connection with the first aspect or any of the possible implementations described above, in a fourth possible implementation in the first aspect, the determining the target resource pool from the at least two resource pools comprises: determining a resource pool with the lowest resource utilization rate in the at least two resource pools as the target resource pool; or determining a resource pool with the lowest resource conflict rate in the at least two resource pools as the target resource pool; or determining a resource pool with the lowest quantity of accessed terminals in the at least two resource pools as the target resource pool; or determining a resource pool with the lowest response time in the at least two resource pools as the target resource pool; or determining a resource pool with the lowest time delay in the at least two resource pools as the target resource pool; or determining a resource pool with the lowest dispersion degree of receiving powers in the at least two resource pools as the target resource pool; or determining a resource pool with the lowest error rate of transmitted blocks in the at least two resource pools as the target resource pool; or determining the target resource pool from a resource pool with the lowest average receiving power in the at least two resource pools.

In connection with the first aspect or any of the possible implementations described above, in a fifth possible implementation of the first aspect, when the condition parameter comprises at least two parameters, the determining the target resource pool from the at least two resource pools comprises: converting the at least two condition parameters corresponding to each resource pool in the at least two resource pools to a same dimension; performing a weighted processing on the converted at least two condition parameters corresponding to each resource pool; and determining the target resource pool from the at least two resource pools according to a value obtained by the weighted processing corresponding to each resource pool.

In combination with the first aspect or any of the possible implementations described above, in a sixth possible implementation in the first aspect, the determining the target resource pool from the at least two resource pools comprises: determining, by the terminal device, the target resource pool from the at least two resource pools according to the condition parameter and according to at least one of a size of a data packet to be transmitted, a Quality of Service, QoS, level of the data packet to be transmitted, a transmitting power for transmitting the data packet to be transmitted, and a downlink path loss.

In combination with the first aspect or any of the possible implementations described above, in a seventh possible implementation in the first aspect, the determining the target resource pool from the at least two resource pools comprises: determining, by the terminal device, a numerical range of a condition parameter corresponding to the data packet to be transmitted according to a corresponding relationship between numerical ranges of the condition parameter and at least one of: sizes of data packets, QoS levels, transmitting powers, and downlink path losses, and according to at least one of the size of the data packet to be transmitted, the QoS level of the data packet to be transmitted, the transmitting power for the data packet to be transmitted, and the downlink path loss; and determining a resource pool, which is in the at least two resource pools, and of which a value of the condition parameter belongs to the numerical range of the condition parameter corresponding to the data packet to be transmitted, as the target resource pool.

In combination with the seventh possible implementation of the first aspect, in an eighth possible implementation of the first aspect, the method further includes: receiving the corresponding relationship sent by the network device.

In combination with the first aspect or any of the possible implementations described above, in a ninth possible implementation in the first aspect, the method further includes: receiving the condition parameter sent by the network device.

In a second aspect, a communication method is provided, comprising: determining, by a terminal device, a first transmitting power according to a downlink path loss between the terminal device and a network device and a target resource pool selected for transmitting data; and transmitting, by the terminal device, data to the network device by using a resource of the target resource pool according to the first transmitting power.

In connection with the second aspect, in a first possible implementation of the second aspect, determining, by the terminal device, the first transmitting power according to the downlink path loss between the terminal device and the network device and the target resource pool selected for transmitting data comprises: determining, by the terminal device, a second transmitting power according to the downlink path loss between the terminal device and the network device; and adjusting the second transmitting power to obtain the first transmitting power according to an adjustment parameter corresponding to the target resource pool.

In combination with the first possible implementation of the second aspect, in a second possible implementation of the second aspect, before the adjusting the second transmitting power to obtain the first transmitting power according to the adjustment parameter corresponding to the target resource pool, the method further comprises: determining the adjustment parameter corresponding to the target resource pool according to a corresponding relationship between condition parameters of resource pools and adjustment parameters, and a condition parameter of the target resource pool, wherein a condition parameter is used for indicating a resource usage condition of a resource pool.

In combination with the second possible implementation of the second aspect, in a third possible implementation of the second aspect, the method further includes: receiving, by the terminal device, the corresponding relationship between the condition parameters of resource pools and the adjustment parameters, which is sent by the network device.

In combination with the second aspect or any of the possible implementations described above, in a fourth possible implementation of the second aspect, before the adjusting the second transmitting power to obtain the first transmitting power according to the adjustment parameter corresponding to the target resource pool, the method further comprises: determining the adjustment parameter corresponding to the target resource pool according to a corresponding relationship between resource pools and adjustment parameters, wherein a condition parameter is used to indicate a resource usage condition of a resource pool.

In combination with the fourth possible implementation of the second aspect, in a fifth possible implementation of the second aspect, the method further comprises: receiving, by the terminal device, the corresponding relationship between the resource pools and the adjustment parameters, which is sent by the network device.

In combination with the second aspect or any of the possible implementations described above, in a sixth possible implementation of the second aspect, determining, by the terminal device, the first transmitting power according to the downlink path loss between the terminal device and the network device and the target resource pool selected for transmitting data comprises: determining, by the terminal device, the first transmitting power according to a condition parameter of the target resource pool, the downlink path loss between the terminal device and the network device, and a corresponding relationship among downlink path losses, transmitting powers, and condition parameters of resource pools, wherein a condition parameter is used for indicating a resource usage condition of a resource pool.

In combination with the sixth possible implementation of the second aspect, in a seventh possible implementation of the second aspect, the method further comprises: receiving the corresponding relationship among the downlink path losses, the transmitting powers, and the condition parameters of resource pools, which is sent by the network device.

In combination with the second aspect or any of the possible implementations described above, in an eighth possible implementation of the second aspect, determining, by the terminal device, the first transmitting power according to the downlink path loss between the terminal device and the network device and the target resource pool selected for transmitting data comprises: determining, by the terminal device, the first transmitting power according to the downlink path loss between the terminal device and the network device, the target resource pool, and a corresponding relationship among downlink path losses, transmitting powers and resource pools.

In combination with the ninth possible implementation of the second aspect, in a tenth possible implementation of the second aspect, the method further comprises: receiving the corresponding relationship among the downlink path losses, the transmitting powers, and the resource pools, which is sent by the network device.

In a third aspect, a communication method is provided, comprising: determining, by a terminal device, a target resource pool according to a downlink path loss between the terminal device and a network device; and communicating, by the terminal device, with the network device by using a resource of the target resource pool.

Optionally, the determining, by the terminal device, the target resource pool from at least two resource pools according to the downlink path loss between the terminal device and the network device comprises: determining, by the terminal device, the target resource pool according to the downlink path loss between the terminal device and the network device and according to a corresponding relationship between downlink path losses and resource pools.

Optionally, the method further comprises: receiving the corresponding relationship sent by the network device.

In a fourth aspect, a communication method is provided, comprising: acquiring, by a network device, a condition parameter of each resource pool in at least two resource pools, wherein the condition parameter is used for indicating a resource usage condition of the resource pool; and transmitting, by the network device, the condition parameter of each resource pool to a terminal device.

Optionally, the method further comprises: transmitting, by the network device, a corresponding relationship between numerical ranges of a condition parameter and at least one of: sizes of data packets, Quality of Service, QoS, levels, transmitting powers, and downlink path losses, to the terminal device.

In a fifth aspect, a communication method is provided, comprising: transmitting, by a network device, a corresponding relationship between downlink path losses and resource pools to a terminal device, so that the terminal device determines a resource pool for transmitting uplink data according to a downlink path loss between the terminal device and the network device and the corresponding relationship.

In a sixth aspect, a communication method is provided, comprising: transmitting, by a network device, a corresponding relationship between resource pools and adjustment parameters to a terminal device, so that the terminal device determines an adjustment parameter according to the corresponding relationship and a resource pool selected for transmitting uplink data, and adjusts a power for transmitting uplink data according to the determined adjustment parameter.

Optionally, the corresponding relationship between the resource pools and the adjustment parameters is determined according to condition parameters of the resource pools, wherein a condition parameter is used to indicate a resource usage condition of a resource pool.

In a seventh aspect, a communication method is provided, comprising: transmitting, by a network device, a corresponding relationship among downlink path losses, transmitting powers, and resource pools to a terminal device, so that the terminal device determines a transmitting power for transmitting uplink data to the network device according to a target resource pool, a downlink path loss between the terminal device and the network device, and the corresponding relationship.

Optionally, the corresponding relationship among the downlink path losses, the transmitting powers, and the resource pools is determined according to condition parameters of the resource pools, wherein a condition parameter is used to indicate a resource usage condition of a resource pool.

In an eighth aspect, a communication method is provided, comprising: transmitting, by a network device, a corresponding relationship between condition parameters of resource pools and adjustment parameters to a terminal device, so that the terminal device determines an adjustment parameter according to the corresponding relationship and a condition parameter of a resource pool selected for transmitting uplink data, and adjusts a power for transmitting uplink data according to the determined adjustment parameter.

In a ninth aspect, a communication method is provided, comprising: transmitting, by a network device, a corresponding relationship among downlink path losses, transmitting powers, and condition parameters of resource pools to a terminal device, so that the terminal device determines a transmitting power for transmitting uplink data to the network device according to a condition parameter of a target resource pool, a downlink path loss between the terminal device and the network device, and the corresponding relationship.

In a tenth aspect, a terminal device is provided, which may include units for implementing the method in the first aspect or any possible implementation thereof, the second aspect or any possible implementation thereof, or the third aspect or any possible implementation thereof.

In an eleventh aspect, a network device is provided, which may include units for implementing the method in any one aspect in the fourth to ninth aspects or any one possible implementation of the any one aspect.

In a twelfth aspect, a terminal device is provided, and the terminal device comprises a memory and a processor, and the memory is used for storing instructions, the processor is used for executing the instructions stored in the memory, and when the processor executes the instructions stored in the memory, the execution causes the processor to implement the method in any one aspect in the first to third aspects or any one possible implementation of the any one aspect.

In a thirteenth aspect, a network device is provided, and the network device comprises a memory and a processor, the memory is used for storing instructions, the processor is used for executing the instructions stored in the memory, and when the processor executes the instructions stored in the memory, the execution causes the processor to implement the method in any one aspect in the fourth to ninth aspects or any one possible implementation of the any one aspect.

In a fourteenth aspect, a storage medium is provided, the storage medium stores a program code, and the program code is used for executing a method in any one aspect in the first to third aspects or any one possible implementation of the any one aspect.

In a fifteenth aspect, a storage medium is provided, the storage medium stores a program code, and the program code is used for executing a method in any one aspect in the fourth to ninth aspects or any one possible implementation of the any one aspect.

BRIEF DESCRIPTION OF DRAWINGS

In order to illustrate technical solutions of the implementations of the present disclosure more clearly, drawings that are referred to in the implementations or the description of the prior art will be briefly introduced below. It is apparent that the drawings described below are only some implementations of the present disclosure, and those skilled in the art may also obtain other drawings according to these drawings without paying an inventive effort.

FIG. 1 is a schematic diagram of a disclosure scenario according to an implementation of the present disclosure.

FIG. 2 is a schematic flowchart of a communication method according to an implementation of the present disclosure.

DETAILED DESCRIPTION

Figures 3, 4:
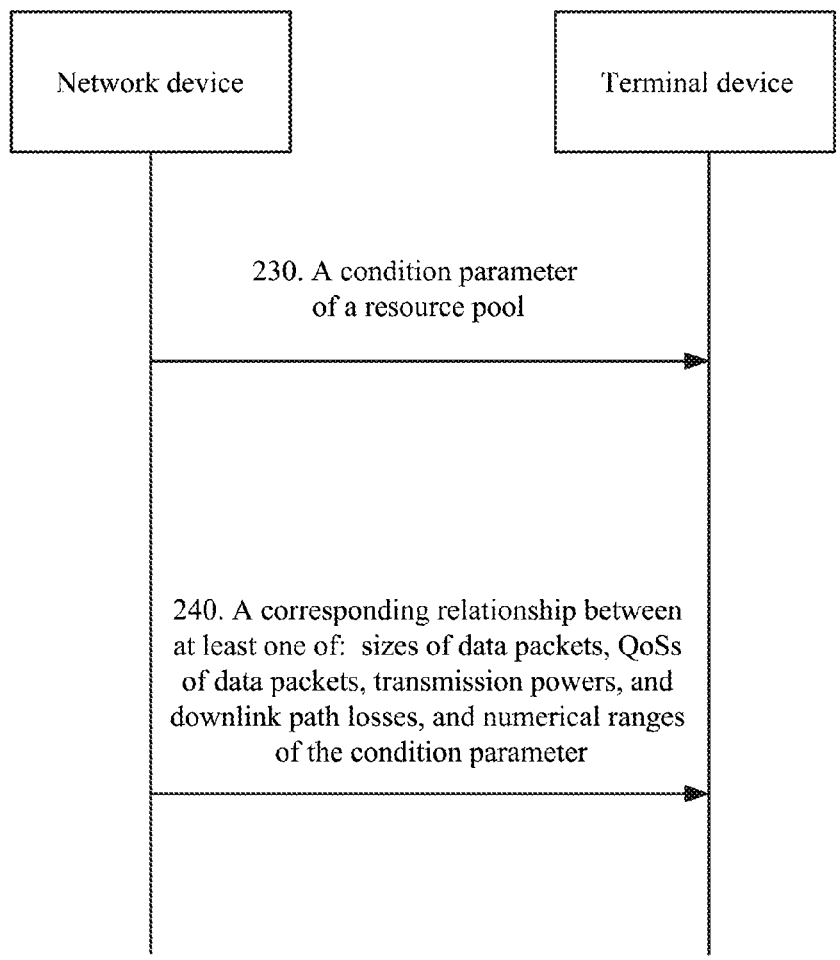
FIG. 3 is a schematic flowchart of a communication method according to an implementation of the present disclosure.
FIG. 4 is a schematic flowchart of a communication method according to an implementation of the present disclosure.

The technical solutions in the implementations of the present disclosure are clearly and completely described in the following with reference to the drawings in the implementations of the present disclosure. It is apparent that the implementations described below are only part, but not all, of the implementations of the present disclosure. All other implementations obtained by those skilled in the art based on the implementations of the present disclosure without paying an inventive effort are within the protection scope of the present disclosure.

It should be understood that specific examples herein are only intended to help those skilled in the art to better understand the implementations of the present disclosure, and are not intended to limit the scope of the implementations of the present disclosure.

It should also be understood that in various implementations of the present disclosure, sequence numbers of various processes do not imply an order of execution of the various processes, which should be determined by their functions and internal logics, and should not constitute any limitation on implementation processes of the implementations of the present disclosure.

The terms "component", "module", "system", and the like, as used in the specification, are used to represent a computer-related entity, hardware, firmware, a combination of hardware and software, software, or software in execution. For example, a component may be, but is not limited to, a process running on a processor, a processor, an object, an executable file, a thread of execution, a program and/or a computer. By way of illustration, both an application running in a computing device and a computing device may be components. One or more components may reside in a process and/or a thread of execution, and the components may be located on one computer and/or distributed between two or more computers. Moreover, these components may be executed from various computer readable media having various data structures stored thereon. A component may, for example, communicate by local and/or remote processes according to signals having one or more data packets (e.g., data from two components interacting with a local system, a distributed system, and/or another component between networks, such as the Internet interacting with other systems via signals).

It should be understood that the technical solutions of the implementations of the present disclosure may be applied to various communication systems, such as a Global System of Mobile Communication (GSM) system, a Code Division Multiple Access (CDMA) system, a Wideband Code Division Multiple Access (WCDMA) system, a Long Term Evolution (LTE) system, a LTE Frequency Division Duplex (FDD) system, a LTE Time Division Duplex (TDD), a Universal Mobile Telecommunication System (UMTS), and a future 5G communication system.

Various implementations are described herein in connection with terminal devices. The terminal devices may also be referred to as user equipment (UE), access terminals, subscriber units, subscriber stations, mobile stations, mobile platforms, remote stations, remote terminals, mobile devices, user terminals, terminals, wireless communication devices, user agents or user devices. An access terminal may be a cellular phone, a cordless phone, a Session Initiation Protocol (SIP) phone, a Wireless Local Loop station, a Personal Digital Assistant (PDA), a handheld device with wireless communication function, a computing device or other processing device connected to a wireless modem, a vehicle-mounted device, a wearable device, a terminal device in a future 5G network, or a terminal device in a future evolved PLMN network, etc.

Various implementations are described herein in connection with network devices. A network device may be a device for communicating with a terminal device, such as a base station (Base Transceiver Station, referred to as "BTS") in a GSM system or CDMA, a base station (NodeB, referred to as "NB") in a WCDMA system, or an evolved base station (Evolutional Node B, referred to as "eNB" or "eNodeB") in a LTE system, or the network device may be a relay station, an access point, a vehicle-mounted device, a wearable device, a network side device in a future 5G network, or a network device in a future evolved PLMN network.

Future wireless communication systems, due to the existence of a large quantity of connections, are greatly different from existing communication systems. The large quantity of connections need to consume more resources to access a UE and more resources for transmission of scheduling signalings related to data transmission of terminal devices.

FIG. 1 shows a schematic diagram of architecture of a communication system to which an implementation of the present disclosure is applied. As shown in FIG. 1, a communication system 100 may include a network device 102 and terminal devices 104 to 114 (simply called UE in the figure) which connect through a wireless connection or a wired connection or other means.

A network in the implementation of the present disclosure may refer to a Public Land Mobile Network (referred to as "PLMN") or a D2D network or an M2M network or other network. FIG. 1 is only a simplified schematic diagram of an example, and other network devices may also be included in the network, which are not shown in FIG. 1.

The present disclosure proposes a contention-based transmission solution. Contention-based transmission may solve a large quantity of MTC-type services in the future networks, as well as satisfy low-time delay and high-reliability transmission of services. Contention-based transmission may be directed to uplink data transmission. Those skilled in the art may know that contention-based transmission may be called as other names, such as spontaneous access, spontaneous multiple access, or unauthorized transmission. Contention-based transmission may be understood as including, but not limited to, any one or more of the following meanings, or a combination of some technical features in the following meanings.

1. Contention-based transmission may refer to: a plurality of transmission resources being pre-allocated and informed, by a network device, to a terminal device; when the terminal device has a requirement for uplink data transmission, selecting at least one transmission resource from the plurality of transmission resources pre-allocated by the network device, and transmitting uplink data using the selected transmission resource; detecting, by the network device, uplink data sent by the terminal device on one or more transmission resources of the pre-allocated plurality of transmission resources. The detection may be blind detection, or may be performed according to a certain control domain in the uplink data, or may be performed in other ways.

2. Contention-based transmission may refer to: a network device pre-allocating and informing a terminal device of a plurality of transmission resources, so that when the terminal device has a requirement for uplink data transmission, at least one transmission resource is selected from the plurality of transmission resources pre-allocated by the network device and uplink data is transmitted by using the selected transmission resource.

3. Contention-based transmission may refer to: obtaining information of a plurality of pre-allocated transmission resources, selecting at least one transmission resource from the plurality of transmission resources when there is a requirement for uplink data transmission, and transmitting uplink data using the selected transmission resource. The way of obtaining the information may be obtained from a network device.

4. Contention-based transmission may refer to: a method of realizing uplink data transmission of a terminal device without dynamic scheduling of a network device. The dynamic scheduling may refer to a scheduling method in which the network device indicates a transmission resource through signaling for each uplink data transmission of the terminal device. Optionally, the manner that the dynamic scheduling of the network devices is not required may be understood as static, and/or, semi-static scheduling. "A and/or B" mentioned in implementations of the invention may represent A and B, or A, or B, and will not be repeated.

5. Contention-based transmission may refer to: performing, by a terminal device, uplink data transmission without an authorization from a network device. The authorization may refer to that the terminal device sends an uplink scheduling request to the network device, and the network device sends an uplink authorization to the terminal device after receiving the scheduling request, wherein the uplink authorization indicates uplink transmission resources allocated to the terminal device.

6. Contention-based transmission may specifically refer to: performing, by a plurality of terminals, uplink data transmission simultaneously on a pre-allocated same time-frequency resource without an authorization from a base station.

The data may include service data or signaling data.

The blind detection may be understood as the detection for data that may have arrived without knowing whether the data has arrived. Or, the blind detection may be understood as the detection without an explicit signaling indication.

The transmission resources may include, but not limited to, one or a combination of the following resources: a time domain resource, such as a radio frame, a subframe, a symbol; a frequency domain resource, such as a subcarrier, a resource block; an airspace resource, such as a transmitting antenna, a beam; a code domain resource, such as a Sparse Code Multiple Access (referred to as "SCMA") code group, a Low Density Signature (referred to as "LDS") group, a CDMA code group, a uplink pilot resource; an interleaved resource; channel coding mode.

The transmission resources may be used for transmissions according to control mechanisms including, but not limited to, uplink power control, such as an upper limit control of uplink transmitting power; modulation coding mode configurations, such as a transmission block size configuration, a code rate configuration, and a modulation order configuration; a retransmission mechanism, such as HARQ mechanism.

Optionally, in the implementation of the present disclosure, a network device may broadcast a plurality of resource pools, a terminal device may select a target resource pool from the broadcast plurality of resource pools, and select a transmission resource from the target resource pool for communication. How to select the resource pool is an urgent problem to be solved.

FIG. 2 is a schematic flowchart of a communication method 200 according to an implementation of the present disclosure. As shown in FIG. 2, the communication method 200 includes the following acts 210 and 220.

In 210, a terminal device determines a target resource pool from at least two resource pools according to a condition parameter of each resource pool of the at least two resource pools, wherein the condition parameter is used to indicate a resource usage condition of the resource pool and may be used to determine a quality of service that the resource pool can provide.

Optionally, in the implementation of the present disclosure, the network device may broadcast the condition parameter of each resource pool, and the terminal device may select the target resource pool according to the condition parameter broadcast by the network device.

Optionally, the network device may periodically broadcast the condition parameter of each resource pool. Or, the network device may broadcast the condition parameter of a resource pool when a change of a value of a condition parameter of a resource pool is greater than a predetermined value.

In 220, the terminal device communicates with the network device by using resources of the target resource pool.

Optionally, a condition parameter of a resource pool may include a resource utilization rate of the resource pool. The utilization rate may refer to a ratio of occupied resources in the resource pool, wherein the utilization rate may refer to a utilization rate of resources counted in a period of time, for example, a utilization rate of resources counted in one minute.

Optionally, when counting an occupancy rate of resources, the minimum unit in a time domain may be a radio frame, a subframe, a slot, or an orthogonal frequency division multiplexing (OFDM) symbol, and the minimum unit in a frequency domain may be a subcarrier. For example, when the minimum unit in the time domain is a slot, as long as any OFDM symbol in the time slot is occupied, the OFDM symbol is considered as being occupied.

Optionally, a condition parameter of a resource pool may include a resource conflict rate. The resource conflict rate may refer to a ratio of resources that have collision in the resource pool, and collision refers to that a plurality of terminals select the same resource for uplink transmission. The resource collision rate may refer to a resource conflict rate counted in a period of time, e.g., a resource conflict rate counted in one minute.

Similarly, when counting a collision rate of resources, the minimum unit in a time domain may be a radio frame, a subframe, a slot, or an OFDM symbol, and the minimum unit in a frequency domain may be a subcarrier. For example, when the minimum unit in the time domain is a subframe, as long as any one slot in a subframe has collision, the subframe is considered to have collision.

Optionally, a condition parameter of a resource pool may include the quantity of accessed terminals in the resource pool, wherein the quantity of terminals may refer to a total quantity of terminals that can be detected by the terminal device, which may include terminals that successfully transmit data, and if terminals that collide can be identified, the total quantity of terminals may further include the quantity of collided terminals that can be identified.

Optionally, a condition parameter of a resource pool may include time delay information of data transmitted by using a resource in the resource pool, wherein the time delay information may be an average time delay of data transmitted by using the resources in the resource pool by a plurality of terminal devices. The time delay corresponding to each terminal device may be the time from transmission of a data packet by the terminal device to successful reception of the data packet, wherein if transmission of the data packet is unsuccessful at the first time, the data packet may be continued to be transmitted until a network device successfully receives the data packet.

Optionally, a condition parameter of a resource pool may include response time information of a network device to data that has been transmitted by using the resource in the resource pool, and the response time information may include an average of response time corresponding to a plurality of terminal devices, wherein the response time corresponding to each terminal device may be the time from the time when the terminal device transmits a data packet for the first time to the time when the network device indicates that the data packet has been successfully transmitted or unsuccessfully received.

Optionally, a condition parameter of a resource pool may include information of receiving powers of resources in the resource pool.

Optionally, the information of receiving power of a resource may be an average receiving power of resources in a resource pool, or dispersion degree information of receiving powers of resources in a resource pool.

The dispersion degree information of the receiving powers of the resources may include a mean square deviation of the receiving powers of the resources in the resource pool. Or, the dispersion degree information of the receiving powers of the resources may include a proportion of resources whose receiving power difference between each other is greater than a predetermined value, etc.

For example, in a resource pool, a proportion of resources with receiving powers greater than 20 dB is 10%, and a proportion of resources with receiving powers less than 10 dB is 12%, then a proportion of resources with receiving power difference between each other greater than 10 dB is 22%.

Optionally, a condition parameter of a resource pool may include an error rate of blocks transmitted by using resources in the resource pool, for example, BLER (Block Error Rate).

It should be understood that various condition parameters of a resource pool have been described above, but the implementations of the present disclosure are not limited thereto, and any information about a usage condition of the resource pool may belong to the condition parameters mentioned in the implementations of the present disclosure.

It should also be understood that a terminal device may select a target resource pool from a plurality of resource pools by using one of the above-mentioned condition parameters, or may select a target resource pool from a plurality of resource pools by using at least two of the above-mentioned condition parameters.

Which condition parameter is specifically considered by a terminal device may be determined according to the type of a service currently being transmitted. For example, if a type of current service has a high requirement for time delay, a resource pool with the lowest time delay may be selected. For example, if a type of current service has a high requirement for a success rate of transmission, a resource pool with the lowest dispersion degree or a resource pool with the lowest error rate may be selected.

It should also be understood that selecting, by a terminal device, a target resource pool from a plurality of resource pools by using the above-mentioned condition parameter, may be directly using the above-mentioned condition parameter to select a target resource pool from a plurality of resource pools, or may be selecting a target resource pool by using other value obtained from the condition parameter. For example, using a resource utilization rate and a resource conflict rate to determine a target resource pool, may be using a sum of the resource utilization rate and the resource conflict rate (wherein a network device may send the sum of the resource utilization rate and the resource conflict rate to the terminal device) to determine the target resource pool.

In order to understand the present disclosure more clearly, the following will be specifically described on how to select a target resource pool from at least two resource pools according to a condition parameter of each resource pool in the at least two resource pools.

For example, a terminal device may select a resource pool with a lower resource utilization rate. Specifically, a resource pool with the lowest resource utilization rate may be determined as a target resource pool, or a target resource pool may be selected from resource pools with resource utilization rates less than or equal to a predetermined threshold.

For example, a terminal device may select a resource pool with a lower resource conflict rate. Specifically, a resource pool with the lowest resource conflict rate may be determined as a target resource pool, or a target resource pool may be selected from resource pools with resource conflict rates less than or equal to a predetermined threshold.

For example, a terminal device may select a resource pool with a smaller quantity of accessed terminals in the resource pool. Specifically, a resource pool with the smallest quantity of accessed terminals may be determined as a target resource pool, or a target resource pool may be selected from resource pools with quantities of accessed terminals less than or equal to a predetermined threshold.

For example, a terminal device may select a resource pool with a lower time delay. Specifically, a resource pool with the corresponding lowest time delay may be determined as a target resource pool, or a target resource pool may be selected from resource pools with corresponding time delays less than or equal to a predetermined threshold.

For example, a terminal device may select a resource pool with a shorter response time. Specifically, a resource pool with the shortest response time may be determined as a target resource pool, or a target resource pool may be selected from resource pools with response time less than or equal to a predetermined threshold.

For example, a terminal device may select a resource pool with a lower error rate. Specifically, a resource pool with the lowest error rate may be determined as a target resource pool, or a target resource pool may be selected from resource pools with error rates less than or equal to a predetermined threshold.

For example, a terminal device may select a resource pool with a lower dispersion degree of receiving powers. Specifically, a resource pool with the lowest dispersion degree of receiving powers may be determined as a target resource pool, or a target resource pool may be selected from resource pools with dispersion degrees of receiving powers less than or equal to a predetermined threshold.

For example, a terminal device may select a resource pool with a lower average receiving power. Specifically, a resource pool with the lowest average receiving power may be selected as a target resource pool, or a target resource pool may be selected from resource pools with receiving powers less than or equal to a predetermined threshold.

Optionally, in the implementation of the present disclosure, when a terminal device considers at least two condition parameters, the at least two condition parameters corresponding to each resource pool in the at least two resource pools are converted to the same dimension; a weighted processing is performed on the converted at least two condition parameters with the same dimension corresponding to each resource pool; and a target resource pool is determined from the at least two resource pools according to a value obtained by the weighted processing corresponding to each resource pool.

For example, if a terminal device needs to select a target resource pool by considering a resource utilization rate and response time, a resource utilization rate of each resource pool may be converted to a value within 0 to 100 according to the resource utilization rate and response time of each resource pool may be converted to a value within 0 to 100; the weighted processing is performed on the converted resource utilization rate and response time, and a target resource pool is selected from a plurality of resource pools according to values after the weighted processing. For example, a resource pool with the smallest value after the weighted processing may be determined as a target resource pool, wherein a weight corresponding to each condition parameter may be determined according to an actual situation.

Optionally, in the implementation of the present disclosure, while using condition parameters of resource pools, a terminal device may determine a target resource pool in combination with at least one of a size of a data packet to be transmitted, a quality of service (QoS) of a data packet to be transmitted, a transmitting power for a data packet to be transmitted, and a downlink path loss (path loss) between the terminal device and a network device.

Optionally, in the implementation of the present disclosure, a numerical range of a condition parameter corresponding to at least one of a size of a data packet to be transmitted, a QoS of a data packet to be transmitted, a transmitting power for a data packet to be transmitted, and a downlink path loss between a terminal device and a network device may be determined according to a corresponding relationship between numerical ranges of the condition parameter and at least one of: sizes of data packets, QoS levels of data packets, transmitting powers, and downlink path losses. A resource pool of which a value of the condition parameter belongs to the numerical range of the condition parameter is determined as a target resource pool.

For example,
resource utilization rate or conflict rate size of a packet

| | |
|---|---|
| $m_1$ | size 1 |
| $m_2$ | size 2 |
| ... | ... |
| $m_i$ | size i |
| ... | ... |

The above corresponding relationship may mean that when the size of a packet is greater than size i, a resource utilization rate cannot be greater than $m_i$. The sizes of packets are arranged from large to small, and the resource utilization or conflict rates are arranged from small to large.

As another example,
time delay of transmission or response time size of a packet

| | |
|---|---|
| $T_1$ | class 1 |
| $T_2$ | class 2 |
| ... | ... |
| $T_i$ | class i |
| ... | ... |

The above corresponding relationship may mean that when a QoS level of a data packet is class i, a time delay of transmission or response time cannot be greater than $T_i$. The QoS levels are arranged from large to small, and the time delays of transmission/response time are arranged from small to large.

As another example,
average receiving power QoS level

| | |
|---|---|
| P1 | class 1 |
| P2 | class 2 |
| ... | ... |
| Pi | class i |
| ... | ... |

The above corresponding relationship may mean that when a QoS level of a data packet is class i, the average receiving power cannot be greater than $P_i$. The QoS levels are arranged from large to small, and the average receiving powers are arranged from small to large.

For example,
error rate of transmitted blocks QoS level

| | |
|---|---|
| B1 | class 1 |
| B2 | class 2 |
| ... | ... |
| Bi | class i |
| ... | ... |

The above corresponding relationship may mean that when a QoS level of a data packet is class i, an error rate of transmitted blocks cannot be greater than $B_i$. The QoS levels are arranged from large to small, and the error rates of transmitted blocks are arranged from small to large.

Optionally, in the implementation of the present disclosure, there may be the following relationship between the size of a data packet and a QoS level of a data packet, and a condition parameter.

For example, a resource utilization rate is negatively correlated to the size of a data packet.

For example, a resource conflict rate is negatively correlated to the size of a data packet.

For example, the quantity of accessed terminals in a resource pool is negatively correlated to the size of a data packet.

For example, a resource utilization rate is negatively correlated to the magnitude of a QoS level of a data packet.

For example, a resource conflict rate is negatively correlated to the magnitude of a QoS level of a data packet.

For example, a time delay of data that has been transmitted using a resource in a resource pool is negatively correlated to a QoS level of a data packet.

For example, the quantity of accessed terminals in a resource pool is negatively correlated to the magnitude of a QoS level of a data packet.

For example, response time of a network device for data that has been transmitted by using a resource in a resource pool is negatively correlated to a QoS level of a data packet.

For example, an error rate of blocks transmitted by using resources in a resource pool is negatively correlated to a QoS level of a data packet.

For example, a dispersion degree of receiving powers of resources in a resource pool is negatively correlated to a QoS level of a data packet.

For example, an average receiving power of resources in a resource pool is negatively correlated to a QoS level of a data packet.

It should be understood that in the implementations of the present disclosure, a negative correlation between A and B may refer to a correlation between A and B in a case of an assumption that other factors are not considered (which does not mean that they are indeed not considered, but only an assumption), wherein a negative correlation refers to a correlation that the larger A is, the smaller B is. The negative correlation between A and B may refer to a correlation between value ranges, for example, a value range of A is [a b], [c d], wherein b is greater than c, a value (or a value in a value range) of B corresponding to [a b] is greater than a value (or a value in a value range) of B corresponding to [c d].

Optionally, as shown in FIG. 3, in the implementation of the present disclosure, a network device may transmit a condition parameter of a resource pool and/or a corresponding relationship between a value range of a condition parameter and at least one of a size of a data packet, a QoS of a data packet, a transmitting power, and a downlink path loss, to a terminal device, so that the terminal device may select a target resource pool from at least two resource pools according to the condition parameter and/or the corresponding relationship sent by the network device.

It should be understood that one or both of acts 230 and 240 shown in FIG. 3 may exist.

Therefore, in the implementation of the disclosure, a terminal device determines a target resource pool from at least two resource pools according to resource usage conditions of resource pools, so that the target resource pool may be selected according to specific usage conditions of resource pools, and an influence on other terminal devices or an influence of other terminal devices on its own data transmission in a transmission process based on contention may be avoided as much as possible.

FIG. 4 is a schematic flowchart of a communication method 300 according to an implementation of the present disclosure. As shown in FIG. 4, the method includes the following acts 310 and 320.

In 310, a terminal device determines a first transmitting power according to a downlink path loss between the terminal device and a network device and a target resource pool selected for transmitting data.

In 320, a terminal device sends data to the network device through a resource of the target resource pool according to the first transmitting power.

Optionally, in the implementation of the present disclosure, a terminal device determines a second transmitting power according to the downlink path loss between the terminal device and the network device; and the second transmitting power is adjusted to obtain the first transmitting power according to an adjustment parameter corresponding to the target resource pool.

Optionally, in the implementation of the present disclosure, a terminal device may determine the adjustment parameter corresponding to the target resource pool according to a corresponding relationship between resource pools and adjustment parameters.

For example, an adjustment parameter corresponding to resource pool 1 is 10 dB, an adjustment parameter corresponding to resource pool 2 is 30 dB, and an adjustment parameter corresponding to resource pool 3 is −10 dB, and the transmitting power obtained by a terminal device according to a path loss is 70 db. If resource pool 1 is selected, the transmitting power of the terminal device for transmitting uplink data is 80 dB, and if resource pool 2 is selected, the transmitting power of the terminal device for transmitting uplink data is 100 dB, and if resource pool 3 is selected, the transmitting power of the terminal device for transmitting uplink data is 60 dB.

Figures 5, 6:
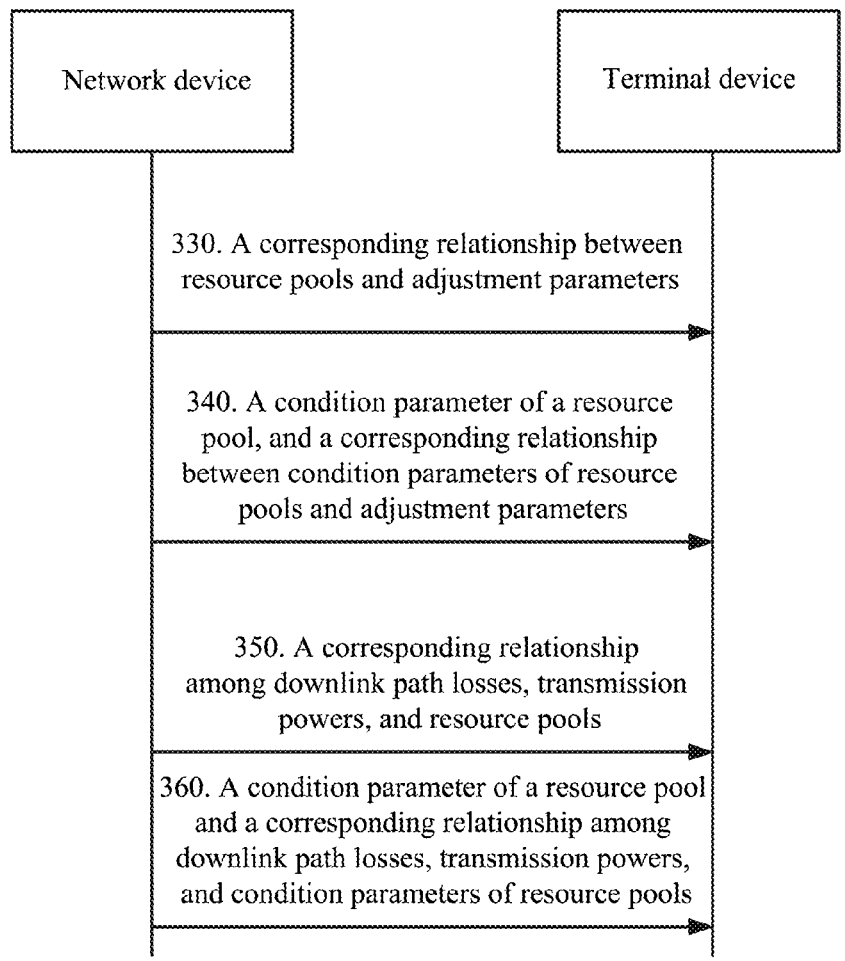
FIG. 5 is a schematic flowchart of a communication method according to an implementation of the present disclosure.
FIG. 6 is a schematic flowchart of a communication method according to an implementation of the present disclosure.

Optionally, in the implementation of the present disclosure, as shown in FIG. 5, a network device may transmit a corresponding relationship between resource pools and adjustment parameters to a terminal device (330), and the terminal device may determine an adjustment parameter for adjusting the transmitting power according to the corresponding relationship transmitted by the network device.

Optionally, the corresponding relationship between resource pools and adjustment parameters may be determined by a network device according to condition parameters of resource pools, such as resource utilization rates and resource conflict rates of resource pools.

For example, for a resource pool with a resource utilization rate less than or equal to 30%, an adjustment parameter is 0 dB, for a resource pool with a resource utilization rate less than or equal to 50% and greater than 30%, an adjustment parameter is 10 dB, and for a resource pool with a resource utilization rate greater than 50%, an adjustment parameter is 30 dB. After a terminal device determines the transmitting power according to the path loss, the determined transmitting power may subtract the adjustment parameter.

Optionally, in the implementation of the present disclosure, a terminal device may determine an adjustment parameter corresponding to a target resource pool according to a corresponding relationship between condition parameters of resource pools and adjustment parameters, and a condition parameter of the target resource pool.

For example, when a terminal device selects a resource pool 2 of which a resource utilization rate is less than or equal to 50% and greater than 30%, then the terminal device may select an adjustment parameter matching the utilization rate, such as 10 dB, and the terminal device may subtract 10 dB from the transmitting power obtained according to a downlink path loss to obtain the final transmitting power.

Optionally, as shown in FIG. 5, a network device may send a condition parameter of a resource pool and a corresponding relationship between condition parameters of resource pools and adjustment parameters to a terminal device (340).

Optionally, in the implementation of the present disclosure, the terminal device determines the first transmitting power according to the target resource pool, a downlink path loss between the terminal device and the network device, and a corresponding relationship among resource pools, downlink path losses, and transmitting powers.

Specifically, different resource pools may correspond to different corresponding relationships between downlink path losses and transmitting powers. After a terminal device selects a target resource pool, it may determine a corresponding relationship between downlink path losses and transmitting powers corresponding to the target resource pool, so as to determine the transmitting power according to the determined corresponding relationship between downlink path losses and transmitting powers and the determined downlink path loss.

In other words, the same downlink path loss may correspond to different transmitting powers for different resource pools.

For example, for the same path loss, the transmitting power corresponding to resource pool 1 is lower than that of resource pool 2.

Optionally, a corresponding relationship among resource pools, downlink path losses, and transmitting powers may be determined by a network device according to condition parameters of resource pools, for example, resource utilization rates and collision rates of resource pools.

For example, a resource utilization rate of resource pool 1 is 70% and a resource utilization rate of resource pool 2 is 30%. For the same path loss, the transmitting power configured for resource pool 1 by a base station is lower than the transmitting power configured for resource pool 2.

Optionally, in the implementation of the present disclosure, as shown in FIG. 5, a network device may send a corresponding relationship among resource pools, downlink path losses, and transmitting powers to a terminal device (350).

Optionally, in the implementation of the present disclosure, a terminal device determines the first transmitting power according to a condition parameter of the target resource pool, a downlink path loss between the terminal device and the network device, and a corresponding relationship among downlink path losses, transmitting powers, and condition parameters of resource pools.

Specifically, values (or ranges) of different condition parameters of resource pools correspond to different corresponding relationships between downlink path losses and transmitting powers, and a terminal device may select a corresponding relationship between downlink path losses and transmitting powers according to a condition parameter of a target resource pool, so as to determine the transmitting power according to the determined corresponding relationship between downlink path losses and transmitting powers and the determined downlink path loss.

In other words, the same downlink path loss, for values (or ranges) of different condition parameters of resource pools, may correspond to different transmitting powers.

If a resource utilization rate of resource pool 1 is 70% and a resource utilization rate of resource pool 2 is 30%, for the same path loss, the transmitting power corresponding to resource pool 1 is lower than that corresponding to resource pool 2.

Optionally, in the implementation of the present disclosure, as shown in FIG. 5, a network device may send a condition parameter of a resource pool and a corresponding relationship among downlink path losses, transmitting powers, and condition parameters of resource pools to the terminal device (360).

It should be understood that one or partial or all of acts 330-360 shown in FIG. 5 may exist.

Therefore, in the implementation of the present disclosure, a terminal device determines transmitting power according to a downlink path loss between the terminal device and a network device and a target resource pool selected for transmitting data, and the determination of the transmitting power may be combined with a specific condition of the selected resource pool (for example, a resource usage condition), so that the transmitting power more suitable for the selected resource pool may be selected.

FIG. 6 is a schematic flowchart of a communication method 400 according to an implementation of the present disclosure. As shown in FIG. 6, the communication method 400 includes the following acts 410 and 420.

In 410, a terminal device determines a target resource pool according to a downlink path loss between the terminal device and a network device.

The terminal device determines the target resource pool according to the downlink path loss between the terminal device and the network device and a corresponding relationship between downlink path losses and resource pools.

For example, for resource pool 1, a corresponding path loss is −20 to −30 dB, and for resource pool 2, a corresponding path loss is −30 to −40 dB. Then a terminal device with a downlink path loss of −20 to −30 dB may select resource pool 1, and a terminal device with a downlink path loss of −30 to −40 dB may select resource pool 2.

Figure 7:
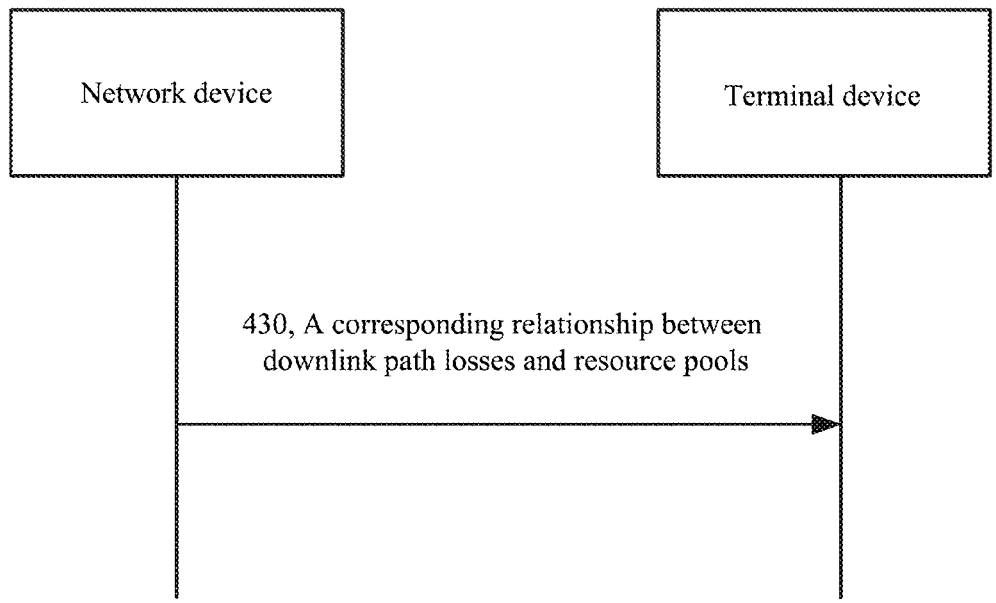
FIG. 7 is a schematic flowchart of a communication method according to an implementation of the present disclosure.

Optionally, as shown in FIG. 7, a network device may send a corresponding relationship between downlink path losses and resource pools to a terminal device (430). Therefore, a terminal device may determine a target resource pool by using the corresponding relationship.

In 420, the terminal device communicates with a network device by using a resource of the target resource pool.

Therefore, in the implementation of the disclosure, a terminal device may select a target resource pool according to a downlink path loss, so that terminals with similar downlink path loss may select the same resource pool. Since the transmitting power may be selected according to a downlink path loss, terminals with similar transmitting power may select the same resource pool, so that a near-far effect caused by selecting the same resource pool by terminals with too large difference of transmitting power between each other may be avoided.

Figure 8:
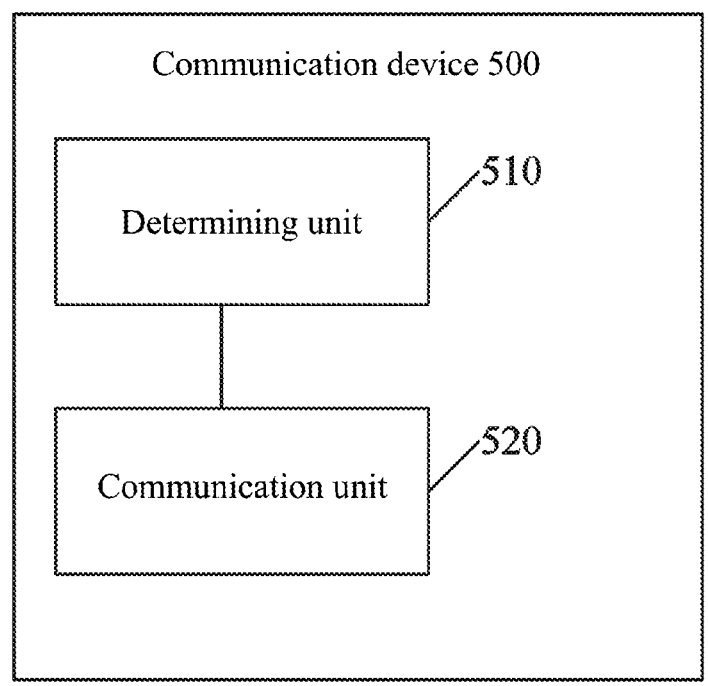
FIG. 8 is a schematic block diagram of a communication device according to an implementation of the present disclosure.

FIG. 8 is a schematic block diagram of a communication device 500 according to an implementation of the present disclosure. As shown in FIG. 5, the communication device 500 may include a determining unit 510 and a communication unit 520.

Optionally, the communication device 500 may be a terminal device, or may be a network device.

In the following, as an example, the communication device 500 will be described as a terminal device.

Optionally, the determining unit 510 is configured to determine a target resource pool from at least two resource pools according to a condition parameter of each of the at least two resource pools, wherein the condition parameter is used to indicate a resource usage condition of the resource pool; and the communication unit 520 is configured to communicate with a network device by using a resource of the target resource pool.

Optionally, the condition parameter includes at least one of the following: a resource utilization rate of the resource pool, a resource conflict rate of the resource pool, the quantity of accessed terminals in the resource pool, information of receiving power of the resource of the resource pool, a time delay of data transmitted using the resource of the resource pool, response time of the network device to data transmitted using the resource of the resource pool, and an error rate of blocks transmitted using the resource of the resource pool.

Optionally, the information of receiving power of the resource of the resource pool comprises at least one of the following: an average receiving power of resources of the resource pool, and dispersion degree information of receiving powers of resources of the resource pool.

Optionally, the determining unit 510 is further configured to determine the target resource pool from resource pools, which are in the at least two resource pools, and of which corresponding resource utilization rates are less than or equal to a first threshold; or determine the target resource pool from resource pools, which are in the at least two resource pools, and of which corresponding resource conflict rates are less than or equal to a second threshold; or determine the target resource pool from resource pools, which are in the at least two resource pools, and in which quantities of accessed terminals are less than or equal to a third threshold; or determine the target resource pool from resource pools, which are in the at least two resource pools, and of which corresponding response time is less than or equal to a fourth threshold; or determine the target resource pool from resource pools, which are in the at least two resource pools, and of which corresponding time delays are less than or equal to a fifth threshold value; or determine the target resource pool from resource pools, which are in the at least two resource pools, and of which corresponding dispersion degrees of receiving powers are less than or equal to a sixth threshold value; or determine the target resource pool from resource pools, which are in the at least two resource pools, and of which corresponding error rates of transmitted blocks are less than or equal to a seventh threshold; or determine the target resource pool from resource pools, which are in the at least two resource pools, and of which corresponding average receiving powers are less than or equal to an eighth threshold.

Optionally, the determining unit 510 is further configured to determine a resource pool with the lowest resource utilization rate in the at least two resource pools as the target resource pool; or determine a resource pool with the lowest resource conflict rate in the at least two resource pools as the target resource pool; or determine a resource pool with the lowest quantity of accessed terminals in the at least two resource pools as the target resource pool; or determine a resource pool with the lowest response time in the at least two resource pools as the target resource pool; or determine a resource pool with the lowest time delay in the at least two resource pools as the target resource pool; or determine a resource pool with the lowest dispersion degree of receiving powers in the at least two resource pools as the target resource pool; or determine a resource pool with the lowest error rate of transmitted blocks in the at least two resource pools as the target resource pool; or determine the target resource pool from a resource pool with the lowest average receiving power in the at least two resource pools.

Optionally, when the condition parameter includes at least two parameters, the determining unit 510 is further configured to: convert the at least two condition parameters corresponding to each resource pool in the at least two resource pools to the same dimension; perform a weighted processing on the converted at least two condition parameters corresponding to each resource pool; and determine the target resource pool from the at least two resource pools according to a value obtained by the weighted processing corresponding to each resource pool.

Optionally, the determining unit 510 is further configured to determine the target resource pool from the at least two resource pools according to the condition parameter and according to at least one of the size of a data packet to be transmitted, a QoS level of the data packet to be transmitted, a transmitting power for transmitting the data packet to be transmitted, and a downlink path loss.

Optionally, the determining unit 510 is further configured to determine a numerical range of a condition parameter corresponding to a data packet to be transmitted according to a corresponding relationship between numerical ranges of the condition parameter and at least one of: sizes of data packets, QoS levels, transmitting powers, and downlink path losses, and according to at least one of the size of the data packet to be transmitted, the QoS level of the data packet to be transmitted, the transmitting power for the data packet to be transmitted, and the downlink path loss; and determine a resource pool, which is in the at least two resource pools, and of which a value of the condition parameter belongs to the numerical range of the condition parameter corresponding to the data packet to be transmitted, as the target resource pool.

Optionally, the communication unit 520 is further configured to receive the corresponding relationship sent by the network device.

Optionally, the communication unit 520 is further configured to receive the condition parameter sent by the network device.

It should be understood that the communication device 500 may perform operations performed by the terminal device in the communication method 200 and various implementations thereof, and will not be described here for brevity.

In the following, as an example, the communication device 500 is described as another terminal device.

Optionally, a determining unit 510 is configured to determine a first transmitting power according to a downlink path loss between the terminal device and a network device and a target resource pool selected for transmitting data; and a communication unit 520 is configured to transmit data to the network device by using a resource of the target resource pool according to the first transmitting power.

Optionally, the determining unit 510 is further configured to determine a second transmitting power according to the downlink path loss between the terminal device and the network device; and adjust the second transmitting power to obtain the first transmitting power according to an adjustment parameter corresponding to the target resource pool.

Optionally, the determining unit 510 is further configured to determine the adjustment parameter corresponding to the target resource pool according to a corresponding relationship between condition parameters of resource pools and adjustment parameters, and a condition parameter of the target resource pool, wherein a condition parameter is used for indicating a resource usage condition of a resource pool.

Optionally, the communication unit 520 is further configured to receive the corresponding relationship between the condition parameters of resource pools and the adjustment parameters, which is sent by the network device.

Optionally, the determining unit 510 is further configured to determine the adjustment parameter corresponding to the target resource pool according to a corresponding relationship between resource pools and adjustment parameters, wherein a condition parameter is used to indicate a resource usage condition of a resource pool.

Optionally, the communication unit 520 is further configured to receive the corresponding relationship between resource pools and adjustment parameters, which is sent by the network device.

Optionally, the determining unit 510 is further configured to determine the first transmitting power according to a condition parameter of the target resource pool, a downlink path loss between the terminal device and the network device, and a corresponding relationship among downlink path losses, transmitting powers, and condition parameters of resource pools, wherein a condition parameter is used for indicating a resource usage condition of a resource pool.

Optionally, the communication unit 520 is further configured to receive the corresponding relationship among the downlink path losses, the transmitting powers, and the condition parameters of resource pools, which is sent by the network device.

Optionally, the determining unit 510 is further configured to determine the first transmitting power according to a downlink path loss between the terminal device and the network device, the target resource pool, and a corresponding relationship among downlink path losses, transmitting powers, and resource pools.

Optionally, the communication unit 520 is further configured to receive the corresponding relationship among the downlink path losses, the transmitting powers, and the resource pools, which is sent by the network device.

Optionally, the communication device may perform operations performed by the terminal device in the communication method 300 and various implementations thereof, and will not be described here for brevity.

As an example, the communication device 500 is described as another terminal device.

Optionally, a determining unit 510 is configured to determine a target resource pool according to a downlink path loss between the terminal device and a network device; and a communication unit 520 is configured to communicate with the network device by using a resource of the target resource pool.

Optionally, the determining unit 510 is further configured to determine the target resource pool according to the downlink path loss between the terminal device and the network device and according to a corresponding relationship between downlink path losses and resource pools.

Optionally, the communication unit 520 is further configured to receive the corresponding relationship sent by the network device.

Optionally, the communication device 500 may perform operations performed by the terminal device in the communication method 400 and various implementations thereof, and will not be described here for brevity.

In the following, as an example, the communication device 500 is described as a network device.

Optionally, the determining unit 510 is configured to determine a condition parameter of each resource pool in at least two resource pools, wherein the condition parameter is used for indicating a resource usage condition of the resource pool; and a communication unit 520 is configured to transmit the condition parameter of each resource pool to the terminal device.

Optionally, the communication unit 520 is further configured to transmit a corresponding relationship between numerical ranges of a condition parameter and at least one of: sizes of data packets, QoS levels, transmitting powers, and downlink path losses, to the terminal device.

In the following, as an example, the communication device 500 is described as another network device.

Optionally, a determining unit 510 is configured to determine a corresponding relationship between downlink path losses and resource pools.

A communication unit 520 is configured to transmit the corresponding relationship to a terminal device, so that the terminal device determines a resource pool for transmitting uplink data according to a downlink path loss between the terminal device and the network device and the corresponding relationship.

In the following, as an example, the communication device 500 is described as another network device.

Optionally, a determining unit 510 is configured to determine a corresponding relationship between resource pools and adjustment parameters.

A communication unit 520 is configured to transmit the corresponding relationship to a terminal device, so that the terminal device determines an adjustment parameter according to the corresponding relationship and a resource pool selected for transmitting uplink data, and adjusts power for transmitting uplink data according to the determined adjustment parameter.

Optionally, the corresponding relationship between resource pools and adjustment parameters is determined according to condition parameters of the resource pools, wherein a condition parameter is used to indicate a resource usage condition of a resource pool.

In the following, as an example, the communication device 500 is described as another network device.

Optionally, a determining unit 510 is configured to determine a corresponding relationship among downlink path losses, transmitting powers, and resource pools.

A communication unit 520 is configured to transmit the corresponding relationship to a terminal device, so that the terminal device determines a transmitting power for transmitting uplink data to the network device according to a target resource pool, a downlink path loss between the terminal device and the network device, and the corresponding relationship.

Optionally, the corresponding relationship among the downlink path losses, the transmitting powers, and the resource pools is determined according to condition parameters of the resource pools, wherein a condition parameter is used to indicate a resource usage condition of a resource pool.

In the following, as an example, the communication device 500 is described as another network device.

Optionally, the determining unit 510 is configured to determine a corresponding relationship between condition parameters of resource pools and adjustment parameters; and a communication unit 520 is configured to transmit the corresponding relationship to a terminal device, so that the terminal device determines an adjustment parameter according to the corresponding relationship and a condition parameter of a resource pool selected for transmitting uplink data, and adjusts power for transmitting uplink data according to the determined adjustment parameter.

In the following, as an example, the communication device 500 is described as another network device.

Optionally, the determining unit 510 is configured to determine a corresponding relationship among downlink path losses, transmitting powers, and condition parameters of resource pools; and a communication unit 520 is configured to transmit the corresponding relationship to a terminal device, so that the terminal device determines a transmitting power for transmitting uplink data to the network device according to a condition parameter of a target resource pool, a downlink path loss between the terminal device and the network device, and the corresponding relationship.

Figure 9:
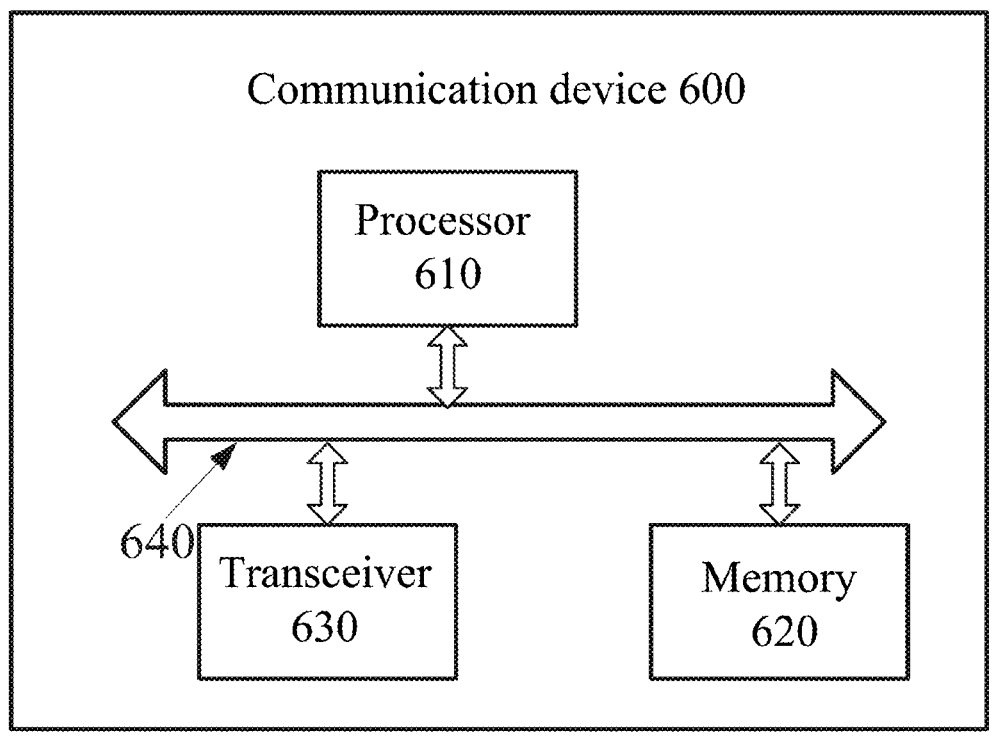
FIG. 9 is a schematic block diagram of a communication device according to an implementation of the present disclosure.

FIG. 9 is a schematic block diagram of a communication device 600 according to an implementation of the present disclosure. The communication device 600 may include a processor 610, a memory 620, and a transceiver 630. The memory 620 is used for storing program instructions. The processor 610 may call program instructions stored in memory 620. The transceiver 630 is used for external communication, and optionally, the communication device 600 further includes a bus system 640 interconnecting the processor 610, the memory 620, and the transceiver 630.

Optionally, the communication device may be a terminal device or a network device.

In the following, as an example, the communication device 600 is described as a terminal device.

Optionally, the processor 610 may call instructions in the memory 620 to perform the following operations: determining a target resource pool from at least two resource pools according to a condition parameter of each resource pool in the at least two resource pools, wherein the condition parameter is used for indicating a resource usage condition of the resource pool; and communicating with a network device by using a resource of the target resource pool through the transceiver 630.

Optionally, the condition parameter comprises at least one of the following: a resource utilization rate of the resource pool, a resource conflict rate of the resource pool, the quantity of accessed terminals in the resource pool, information of receiving power of the resource of the resource pool, a time delay of data that has been transmitted using the resource of the resource pool, response time of the network device for data that has been transmitted using the resource of the resource pool, and an error rate of blocks that have been transmitted using the resource of the resource pool.

Optionally, the information of receiving power of the resource of the resource pool comprises at least one of the following: an average receiving power of the resources of the resource pool, and dispersion degree information of receiving powers of the resources of the resource pool.

Optionally, the processor 610 may call instructions in the memory 620 to further perform the following operations: determining the target resource pool from resource pools, which are in the at least two resource pools, and whose corresponding resource utilization rates are less than or equal to a first threshold; or determining the target resource pool from resource pools, which are in the at least two resource pools, and whose corresponding resource conflict rates are less than or equal to a second threshold; or determining the target resource pool from resource pools, which are in the at least two resource pools, and in which the quantities of accessed terminals are less than or equal to a third threshold; or determining the target resource pool from resource pools, which are in the at least two resource pools, and whose corresponding response time is less than or equal to a fourth threshold; or determining the target resource pool from resource pools, which are in the at least two resource pools, and whose corresponding time delays are less than or equal to a fifth threshold value; or determining the target resource pool from resource pools, which are in the at least two resource pools, and whose corresponding dispersion degrees of receiving powers are less than or equal to a sixth threshold value; or determining the target resource pool from resource pools, which are in the at least two resource pools, and whose corresponding error rates of transmitted blocks are less than or equal to a seventh threshold; or determining the target resource pool from resource pools, which are in the at least two resource pools, and whose corresponding average receiving powers are less than or equal to an eighth threshold.

Optionally, the processor 610 may call instructions in the memory 620 to further perform the following operations: determining a resource pool with the lowest resource utilization rate in the at least two resource pools as the target resource pool; or determining a resource pool with the lowest resource conflict rate in the at least two resource pools as the target resource pool; or determining a resource pool with the lowest quantity of accessed terminals in the at least two resource pools as the target resource pool; or determining a resource pool with the lowest response time in the at least two resource pools as the target resource pool; or determining a resource pool with the lowest time delay in the at least two resource pools as the target resource pool; or determining a resource pool with the lowest dispersion degree of receiving powers in the at least two resource pools as the target resource pool; or determining a resource pool with the lowest error rate of transmitted blocks in the at least two resource pools as the target resource pool; or determining the target resource pool from a resource pool with the lowest average receiving power in the at least two resource pools.

Optionally, the processor 610 may call instructions in the memory 620 to further perform the following operations: when the condition parameter comprises at least two parameters, converting the at least two condition parameters corresponding to each resource pool in the at least two resource pools to the same dimension; performing a weighted processing on the converted at least two condition parameters corresponding to each resource pool; and determining the target resource pool from the at least two resource pools according to a value obtained by the weighted processing corresponding to each resource pool.

Optionally, the processor 610 may call instructions in the memory 620 to further perform the following operations: determining the target resource pool from at least two resource pools according to the condition parameter and according to at least one of a size of a data packet to be transmitted, a QoS level of the data packet to be transmitted, a transmitting power to transmit the data packet to be transmitted, and a downlink path loss.

Optionally, the processor 610 may call instructions in the memory 620 to further perform the following operations: determining a numerical range of a condition parameter corresponding to a data packet to be transmitted according to a corresponding relationship between numerical ranges of the condition parameter and at least one of: sizes of data packets, QoS levels, transmitting powers, and downlink path losses, and according to at least one of the size of the data packet to be transmitted, the QoS level of the data packet to be transmitted, the transmitting power of the data packet to be transmitted, and the downlink path loss; and determining a resource pool, which is in the at least two resource pools, and of which a value of the condition parameter belongs to the numerical range of the condition parameter corresponding to the data packet to be transmitted, as the target resource pool.

Optionally, the processor 610 may call instructions in the memory 620 to further perform the following operations: receiving the corresponding relationship sent by the network device through the transceiver 630.

Optionally, the processor 610 may call instructions in the memory 620 to further perform the following operations: receiving the condition parameter sent by the network device through the transceiver 630.

Optionally, the communication device 600 may perform operations performed by the terminal device in the communication method 200 and various implementations thereof, and will not be described here for brevity.

In the following, as an example, the communication device 600 is described as a terminal device.

Optionally, processor 610 may call instructions in memory 620 to perform the following operations: determining a first transmitting power according to a downlink path loss between the terminal device and a network device and a target resource pool selected for transmitting data; and transmitting data to the network device by using a resource of the target resource pool according to the first transmitting power through the transceiver 630.

Optionally, the processor 610 may call instructions in the memory 620 to further perform the following operations: determining a second transmitting power according to the downlink path loss between the terminal device and the network device; and adjusting the second transmitting power to obtain the first transmitting power according to an adjustment parameter corresponding to the target resource pool.

Optionally, the processor 610 may call instructions in the memory 620 to further perform the following operations: determining the adjustment parameter corresponding to the target resource pool according to a corresponding relationship between condition parameters of resource pools and adjustment parameters, and a condition parameter of the target resource pool, wherein a condition parameter is used for indicating a resource usage condition of a resource pool.

Optionally, the processor 610 may call instructions in the memory 620 to further perform the following operations: receiving the corresponding relationship between the condition parameters of resource pools and the adjustment parameters, which is sent by the network device, through the transceiver 630.

Optionally, the processor 610 may call instructions in the memory 620 to further perform the following operations: determining the adjustment parameter corresponding to the target resource pool according to a corresponding relationship between resource pools and adjustment parameters, wherein a condition parameter is used to indicate a resource usage condition of a resource pool.

Optionally, the processor 610 may call instructions in the memory 620 to further perform the following operations: receiving the corresponding relationship between the resource pools and the adjustment parameters, which is sent by the network device, through the transceiver 630.

Optionally, the processor 610 may call instructions in the memory 620 to further perform the following operations: determining the first transmitting power according to a condition parameter of the target resource pool, a downlink path loss between the terminal device and the network device, and a corresponding relationship among downlink path losses, transmitting powers, and condition parameters of resource pools, wherein a condition parameter is used for indicating a resource usage condition of a resource pool.

Optionally, the processor 610 may call instructions in the memory 620 to further perform the following operations: receiving the corresponding relationship among the downlink path losses, the transmitting powers, and the condition parameters of resource pools, which is sent by the network device, through the transceiver 630.

Optionally, the processor 610 may call instructions in the memory 620 to further perform the following operations: determining the first transmitting power according to a downlink path loss between the terminal device and the network device, the target resource pool, and a corresponding relationship among downlink path losses, transmitting powers, and resource pools.

Optionally, the processor 610 may call instructions in the memory 620 to further perform the following operations: receiving the corresponding relationship among the downlink path losses, the transmitting powers, and the resource pools, which is sent by the network device, through the transceiver 630.

Optionally, the communication device 600 may perform operations performed by the terminal device in the communication method 300 and various implementations thereof, and will not be described here for brevity.

In the following, as an example, the communication device 600 is described as a terminal device.

Optionally, a processor 610 may call instructions in a memory 620 to perform the following operations: determining a target resource pool according to a downlink path loss between the terminal device and a network device; and communicating with the network device by using a resource of the target resource pool through transceiver 630.

Optionally, the processor 610 may call instructions in the memory 620 to further perform the following operations: determining the target resource pool according to the downlink path loss between the terminal device and the network device and according to a corresponding relationship between downlink path losses and resource pools.

Optionally, the processor 610 may call instructions in the memory 620 to further perform the following operations: receiving the corresponding relationship sent by the network device through the transceiver 630.

Optionally, the communication device 600 may perform operations performed by the terminal device in the communication method 400 and various implementations thereof, and will not be described here for brevity.

In the following, as an example, the communication device 600 is described as a network device.

Optionally, a processor 610 may call instructions in a memory 620 to perform the following operations: acquiring a condition parameter of each resource pool in at least two resource pools, wherein the condition parameter is used for indicating a resource usage condition of the resource pool; and transmitting the condition parameter of each resource pool to the terminal device through the transceiver 630.

Optionally, the processor 610 may call instructions in the memory 620 to further perform the following operations: transmitting a corresponding relationship between numerical ranges of a condition parameter and at least one of: sizes of data packets, QoS levels, transmitting powers, and downlink path losses, to the terminal device through the transceiver 630.

In the following, as an example, the communication device 600 is described as a network device.

Optionally, a processor 610 may call instructions in a memory 620 to perform the following operations: transmitting a corresponding relationship between downlink path losses and resource pools to a terminal device through the transceiver 630, so that the terminal device determines a resource pool for transmitting uplink data according to a downlink path loss between the terminal device and the network device and the corresponding relationship.

In the following, as an example, the communication device 600 is described as a network device.

Optionally, a processor 610 may call instructions in a memory 620 to perform the following operations: transmitting a corresponding relationship between resource pools and adjustment parameters to a terminal device through the transceiver 630, so that the terminal device determines an adjustment parameter according to the corresponding relationship and a resource pool selected for transmitting uplink data, and adjusts power for transmitting uplink data according to the determined adjustment parameter.

Optionally, the corresponding relationship between the resource pools and the adjustment parameters is determined according to condition parameters of the resource pools, wherein a condition parameter is used to indicate a resource usage condition of a resource pool.

In the following, as an example, the communication device 600 is described as a network device.

Optionally, a processor 610 may call instructions in a memory 620 to perform the following operations: transmitting a corresponding relationship among downlink path losses, transmitting powers, and resource pools to a terminal device through the transceiver 630, so that the terminal device determines a transmitting power for transmitting uplink data to the network device according to a target resource pool, a downlink path loss between the terminal device and the network device, and the corresponding relationship.

Optionally, the corresponding relationship among the downlink path losses, the transmitting powers, and the resource pools is determined according to condition parameters of the resource pools, wherein a condition parameter is used to indicate a resource usage condition of a resource pool.

In the following, as an example, the communication device 600 is described as a network device.

Optionally, a processor 610 may call instructions in a memory 620 to perform the following operations: transmitting a corresponding relationship between condition parameters of resource pools and adjustment parameters to a terminal device through the transceiver 630, so that the terminal device determines an adjustment parameter according to the corresponding relationship and a condition parameter of a resource pool selected for transmitting uplink data, and adjusts a transmitting power for transmitting uplink data according to the determined adjustment parameter.

In the following, as an example, the communication device 600 is described as a network device.

Optionally, a processor 610 may call instructions in a memory 620 to perform the following operations: transmitting a corresponding relationship among downlink path losses, transmitting powers, and condition parameters of resource pools to a terminal device through the transceiver 630, so that the terminal device determines a transmitting power for transmitting uplink data to the network device according to a condition parameter of a target resource pool, a downlink path loss between the terminal device and the network device, and the corresponding relationship.

In an implementation of the present disclosure, the processor may be a central processing unit (CPU), a network processor (NP), or a combination of CPU and NP. The processor may further include a hardware chip. The hardware chip may be an application-specific integrated circuit (ASIC), a programmable logic device (PLD), or a combination thereof. The PLD may be a complex programmable logic device (CPLD), a field programmable gate array (FPGA), a generic array logic (GAL), or any combination thereof.

The memory may be a volatile memory or non-volatile memory, or may include both volatile and non-volatile memories. The non-volatile memory may be read-only memory (ROM), programmable read-only memory (PROM), erasable programmable read-only memory (EPROM), electrically erasable programmable read-only memory (EEPROM), or flash memory. The volatile memory may include a random access memory (RAM) as an external cache memory.

In addition to a data bus, the bus system may include a power bus, a control bus, a status signal bus, etc. For convenience of representation, only one thick line is used to represent the bus system, but it does not represent only one bus or one type of bus.

Implementations of the present disclosure provide a computer readable medium for storing a computer program for executing the above communication methods. The readable medium may be ROM or RAM, to which the implementations of the present disclosure are not limited.

It should be understood that the terms "and/or" and "at least one of A or B" in the invention are merely an association relationship describing associated objects, indicating that there may be three relationships, for example, A and/or B may indicate that only A exists, both A and B exist, and only B exists. In addition, the character "/" in the invention generally indicates that objects before and after the symbol have a relationship of "or".

Those of ordinary skill in the art will recognize that the exemplary elements and algorithm steps described in connection with the implementations disclosed herein may be implemented in an electronic hardware, or a combination of computer software and electronic hardware. Whether these functions are performed in hardware or software depends on specific applications and design constraints of a technical solution. A person skilled in the art may use different methods for implementing the described functions for each particular application, but such implementation should not be considered beyond the scope of the present disclosure.

Those skilled in the art may clearly understand that for convenience and conciseness of description, the specific working process of the system, apparatus and unit described above may refer to the corresponding process in the aforementioned implementations of methods, and details are not described herein again.

In several implementations provided in the present disclosure, it should be understood that the disclosed system, apparatus, and method may be implemented in other ways. For example, the implementations of devices described above are only illustrative, for example, the division of units is only a division of logical functions, and there may be another division manner in actual implementation, for example, multiple units or components may be combined or may be integrated into another system, or some features may be ignored or not executed. On the other hand, the mutual coupling or direct coupling or communication connection shown or discussed may be indirect coupling or communication connection through some interfaces, apparatuses or units, and may be in electrical, mechanical or other forms.

The unit described as a separate component may or may not be physically separated, and the component shown as a unit may or may not be a physical unit, i.e., may be located in one place or may be distributed over multiple network units. Some or all of the units may be selected according to actual needs to achieve the purpose of the solution of the implementation.

In addition, various functional units in various implementations of the present disclosure may be integrated into one processing unit, or each unit may exist physically separately, or two or more units may be integrated into one unit.

The functions may be stored in a computer readable storage medium if they are implemented in a form of a software function unit and sold or used as an independent product. Based on such understanding, a technical solution of the present disclosure essentially, or part of the technical solution contributing to the prior art, or part of the technical solution, may be embodied in a form of a software product stored in a storage medium, including several instructions for causing a computer device (which may be a personal computer, a server, or a network device, etc.) to perform all or part of the steps of the method described in various implementations of the present disclosure. The aforementioned storage medium includes U disk, mobile hard disk, read-only memory (ROM), random access memory (RAM), magnetic disk, optical disk, or other medium capable of storing program codes.

The above implementations are only exemplary implementations of the present disclosure, but the scope of the present disclosure is not limited thereto. Within the technical scope of the present disclosure, any person skilled in the art may easily conceive changes or substitutions which should be covered in the protection scope of the present disclosure. Therefore, the scope of protection of the present disclosure shall be determined by the scope of protection of the claims.

What is claimed is:

1. A method of communication, comprising:
   determining, by a terminal device, a target resource pool from at least two resource pools according to a condition parameter of each resource pool in the at least two resource pools, wherein the condition parameter is used for indicating a resource usage condition of the resource pool; and
   communicating, by the terminal device, with a network device by using a resource of the target resource pool,
   wherein when the condition parameter comprises at least two parameters, the determining the target resource pool from the at least two resource pools comprises:
   converting the at least two condition parameters corresponding to each resource pool in the at least two resource pools to a same dimension;
   performing a weighted processing on the converted at least two condition parameters corresponding to each resource pool; and
   determining the target resource pool from the at least two resource pools according to a value obtained by the weighted processing corresponding to each resource pool.

2. The method according to claim 1, wherein the condition parameter comprises at least one of the following:
   a resource utilization rate of the resource pool, a resource conflict rate of the resource pool, a quantity of accessed terminals in the resource pool, information of a receiving power of a resource of the resource pool, a time delay of data transmitted using a resource of the resource pool, response time of the network device to data transmitted using a resource of the resource pool, and an error rate of blocks transmitted using resources of the resource pool.

3. The method according to claim 2, wherein the information of the receiving power of the resource of the resource pool comprises at least one of the following:
   an average receiving power of resources of the resource pool, and dispersion degree information of receiving powers of the resources of the resource pool.

4. The method according to claim 1, wherein the determining the target resource pool from the at least two resource pools comprises:
   determining the target resource pool from resource pools, which are in the at least two resource pools, and whose corresponding resource utilization rates are less than or equal to a first threshold; or
   determining the target resource pool from resource pools, which are in the at least two resource pools, and whose corresponding resource conflict rates are less than or equal to a second threshold; or
   determining the target resource pool from resource pools, which are in the at least two resource pools, and in which quantities of accessed terminals are less than or equal to a third threshold; or
   determining the target resource pool from resource pools, which are in the at least two resource pools, and whose corresponding response time is less than or equal to a fourth threshold; or
   determining the target resource pool from resource pools, which are in the at least two resource pools, and whose corresponding time delays are less than or equal to a fifth threshold value; or
   determining the target resource pool from resource pools, which are in the at least two resource pools, and whose corresponding dispersion degrees of receiving powers are less than or equal to a sixth threshold value; or
   determining the target resource pool from resource pools, which are in the at least two resource pools, and whose corresponding error rates of transmitted blocks are less than or equal to a seventh threshold; or
   determining the target resource pool from resource pools, which are in the at least two resource pools, and whose corresponding average receiving powers are less than or equal to an eighth threshold,
   or,
   the determining the target resource pool from the at least two resource pools comprises:
   determining a resource pool with the lowest resource utilization rate in the at least two resource pools as the target resource pool; or
   determining a resource pool with the lowest resource conflict rate in the at least two resource pools as the target resource pool; or
   determining a resource pool with the lowest quantity of accessed terminals in the at least two resource pools as the target resource pool; or
   determining a resource pool with the lowest response time in the at least two resource pools as the target resource pool; or
   determining a resource pool with the lowest time delay in the at least two resource pools as the target resource pool; or
   determining a resource pool with the lowest dispersion degree of receiving powers in the at least two resource pools as the target resource pool; or
   determining a resource pool with the lowest error rate of transmitted blocks in the at least two resource pools as the target resource pool; or determining the target resource pool from a resource pool with the lowest average receiving power in the at least two resource pools, or the determining the target resource pool from the at least two resource pools comprises:

determining, by the terminal device, the target resource pool from the at least two resource pools according to the condition parameter and according to at least one of a size of a data packet to be transmitted, a Quality of Service (QoS) level of the data packet to be transmitted, a transmitting power for transmitting the data packet to be transmitted, and a downlink path loss.

5. The method according to claim 4, wherein the determining the target resource pool from the at least two resource pools comprises:

determining, by the terminal device, a numerical range of a condition parameter corresponding to a data packet to be transmitted according to a corresponding relationship between numerical ranges of the condition parameter and at least one of: sizes of data packets, QoS levels, transmitting powers, and downlink path losses, and according to at least one of the size of the data packet to be transmitted, the QoS level of the data packet to be transmitted, the transmitting power for transmitting the data packet to be transmitted, and the downlink path loss; and determining a resource pool, which is in the at least two resource pools, and of which a value of the condition parameter belongs to the numerical range of the condition parameter corresponding to the data packet to be transmitted, as the target resource pool.

6. The method according to claim 5, further comprising:
receiving the corresponding relationship sent by the network device.

7. The method according to claim 1, further comprising:
receiving the condition parameter sent by the network device.

8. A method of communication, comprising:

determining, by a terminal device, a first transmitting power according to a downlink path loss between the terminal device and a network device and a target resource pool selected for transmitting data; and transmitting, by the terminal device, data to the network device by using a resource of the target resource pool according to the first transmitting power, wherein selecting, by the terminal device, the target resource pool for transmitting data, comprises:

converting at least two condition parameters corresponding to each resource pool in at least two resource pools to a same dimension;

performing a weighted processing on the converted at least two condition parameters corresponding to each resource pool; and determining the target resource pool from the at least two resource pools according to a value obtained by the weighted processing corresponding to each resource pool.

9. The method according to claim 8, wherein the determining, by the terminal device, the first transmitting power according to the downlink path loss between the terminal device and the network device and the target resource pool selected for transmitting data comprises:

determining, by the terminal device, a second transmitting power according to the downlink path loss between the terminal device and the network device; and adjusting the second transmitting power to obtain the first transmitting power according to an adjustment parameter corresponding to the target resource pool, or, determining, by the terminal device, the first transmitting power according to a condition parameter of the target resource pool, the downlink path loss between the terminal device and the network device, and a corresponding relationship among downlink path losses, transmitting powers, and condition parameters of resource pools, wherein a condition parameter is used for indicating a resource usage condition of a resource pool, or, determining, by the terminal device, the first transmitting power according to the downlink path loss between the terminal device and the network device, the target resource pool, and a corresponding relationship among downlink path losses, transmitting powers, and resource pools.

10. The method according to claim 9, wherein before the adjusting the second transmitting power to obtain the first transmitting power according to the adjustment parameter corresponding to the target resource pool, the method further comprises:

determining the adjustment parameter corresponding to the target resource pool according to a corresponding relationship between condition parameters of resource pools and adjustment parameters, and a condition parameter of the target resource pool, wherein a condition parameter is used for indicating a resource usage condition of a resource pool, or, determining the adjustment parameter corresponding to the target resource pool according to a corresponding relationship between resource pools and adjustment parameters.

11. The method according to claim 10, further comprising:

receiving, by the terminal device, the corresponding relationship between the condition parameters of resource pools and the adjustment parameters, which is sent by the network device.

12. The method according to claim 10, further comprising:

receiving, by the terminal device, the corresponding relationship between the resource pools and the adjustment parameters, which is sent by the network device.

13. The method according to claim 9, further comprising:
receiving the corresponding relationship among the downlink path losses, the transmitting powers, and the condition parameters of resource pools, which is sent by the network device.

14. The method according to claim 9, further comprising:
receiving the corresponding relationship among the downlink path losses, the transmitting powers, and the resource pools, which is sent by the network device.

15. A communication device, comprising a processor and a transceiver, wherein the processor is configured to determine a target resource pool from at least two resource pools according to a condition parameter of each resource pool in the at least two resource pools, wherein the condition parameter is used for indicating a resource usage condition of the resource pool; and the processor is further-configured to communicate with a network device through the transceiver by using a resource of the target resource pool, wherein when the condition parameter includes at least two parameters, the processor is further configured to:

convert the at least two condition parameters corresponding to each resource pool in the at least two resource pools to a same dimension;

perform a weighted processing on the converted at least two condition parameters corresponding to each resource pool; and determine the target resource pool from the at least two resource pools according to a value obtained by the weighted processing corresponding to each resource pool.

16. The communication device according to claim 15, wherein the condition parameter comprises at least one of the following:

a resource utilization rate of the resource pool, a resource conflict rate of the resource pool, a quantity of accessed terminals in the resource pool, information of a receiving power of a resource of the resource pool, a time delay of data transmitted using a resource of the resource pool, response time of the network device to data transmitted using a resource of the resource pool, and an error rate of blocks transmitted using resources of the resource pool.

17. The communication device according to claim 16, wherein the information of the receiving power of the resource of the resource pool comprises at least one of the following:

an average receiving power of resources of the resource pool, and dispersion degree information of receiving powers of the resources of the resource pool.

18. The communication device according to claim 15, wherein the processor is further configured to:

determine the target resource pool from resource pools, which are in the at least two resource pools, and whose corresponding resource utilization rates are less than or equal to a first threshold; or determine the target resource pool from resource pools, which are in the at least two resource pools, and whose corresponding resource conflict rates are less than or equal to a second threshold; or determine the target resource pool from resource pools, which are in the at least two resource pools, and in which quantities of accessed terminals are less than or equal to a third threshold; or determine the target resource pool from resource pools, which are in the at least two resource pools, and whose corresponding response time is less than or equal to a fourth threshold; or determine the target resource pool from resource pools, which are in the at least two resource pools, and whose corresponding time delays are less than or equal to a fifth threshold value; or determine the target resource pool from resource pools, which are in the at least two resource pools, and whose corresponding dispersion degrees of receiving powers are less than or equal to a sixth threshold value; or determine the target resource pool from resource pools, which are in the at least two resource pools, and whose corresponding error rates of transmitted blocks are less than or equal to a seventh threshold; or determine the target resource pool from resource pools, which are in the at least two resource pools, and whose corresponding average receiving powers are less than or equal to an eighth threshold, or wherein the processor is further configured to:

determine a resource pool with the lowest resource utilization rate in the at least two resource pools as the target resource pool; or determine a resource pool with the lowest resource conflict rate in the at least two resource pools as the target resource pool; or determine a resource pool with the lowest quantity of accessed terminals in the at least two resource pools as the target resource pool; or determine a resource pool with the lowest response time in the at least two resource pools as the target resource pool; or determine a resource pool with the lowest time delay in the at least two resource pools as the target resource pool; or determine a resource pool with the lowest dispersion degree of receiving powers in the at least two resource pools as the target resource pool; or determine a resource pool with the lowest error rate of transmitted blocks in the at least two resource pools as the target resource pool; or determine the target resource pool from a resource pool with the lowest average receiving power in the at least two resource pools, or wherein the processor is further configured to:

determine the target resource pool from the at least two resource pools according to the condition parameter and according to at least one of a size of a data packet to be transmitted, a Quality of Service (QoS) level of the data packet to be transmitted, a transmitting power for transmitting the data packet to be transmitted, and a downlink path loss.

* * * * *